United States Patent [19]

Hofsäss

[11] Patent Number: 5,023,744
[45] Date of Patent: Jun. 11, 1991

[54] TEMPERATURE SWITCHING DEVICE

[76] Inventor: Peter Hofsäss, Strietweg 45, D-7530 Pforzheim, Fed. Rep. of Germany

[21] Appl. No.: 350,767

[22] Filed: May 12, 1989

[30] Foreign Application Priority Data

May 20, 1988 [DE] Fed. Rep. of Germany ... 8806648[U]

[51] Int. Cl.$^5$ .............................................. H02H 5/04
[52] U.S. Cl. ...................................... 361/26; 361/105; 337/89; 337/365; 337/380
[58] Field of Search ...................... 361/23, 25, 26, 103, 361/105; 337/29, 343, 365, 348, 380, 379

[56] References Cited

U.S. PATENT DOCUMENTS 4,306,211 12/1981 Hofsass ........................... 337/280 X
4,470,033 9/1984 Hofsass ........................... 337/365 X
4,701,824 10/1987 Beggs et al. .......................... 361/24

Primary Examiner—Derek S. Jennings
Attorney, Agent, or Firm—Antonelli, Terry, Stout & Kraus

[57] ABSTRACT

A temperature switching device for an electrotechnical part to be protected against an excess temperature due to a fault, with a first bimetallic switch and an ohmic resistor connected in parallel thereto, so that, after opening the bimetallic switch as a result of an excess temperature, the flow of current takes place across the ohmic resistor, which produces heat and as a result the bimetallic switch is kept open even in the case of the cooling of the excess temperature initially triggering the switching process due to a malfunction of the electrotechnical part to be protected, as a result of the evolution of heat of the ohmic resistor. At least the ohmic resistor is connected in series with a further automatically resettable thermal switch having an opening temperature above that of the first thermal switch, but well below temperatures causing irreversible damage to bimetallic elements and the two thermal switches being in close thermal contact.

25 Claims, 5 Drawing Sheets

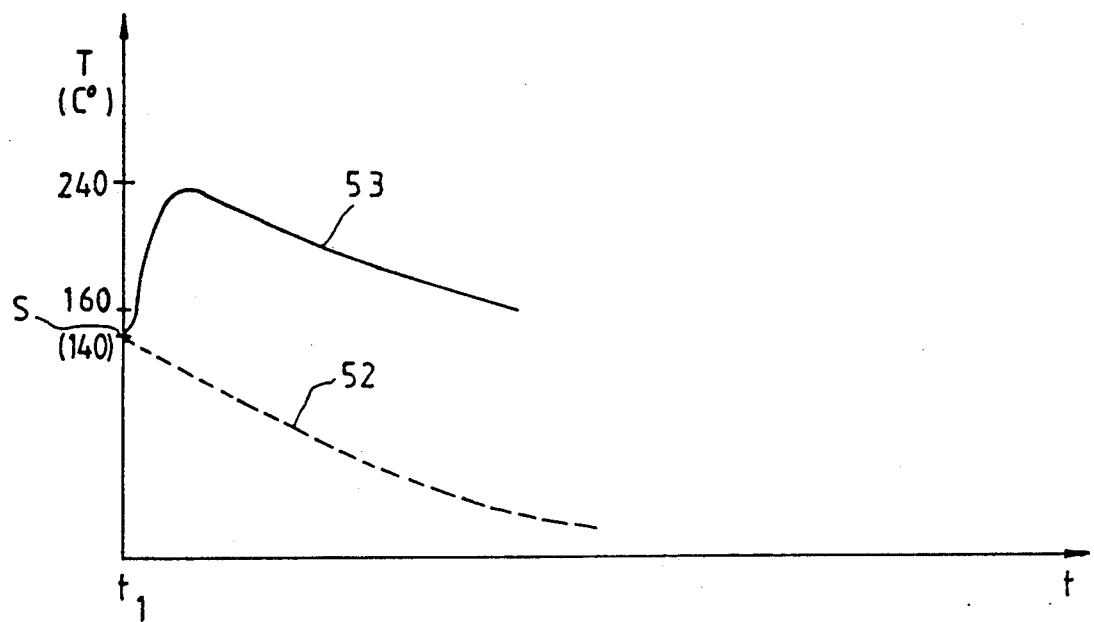
Fig. 8
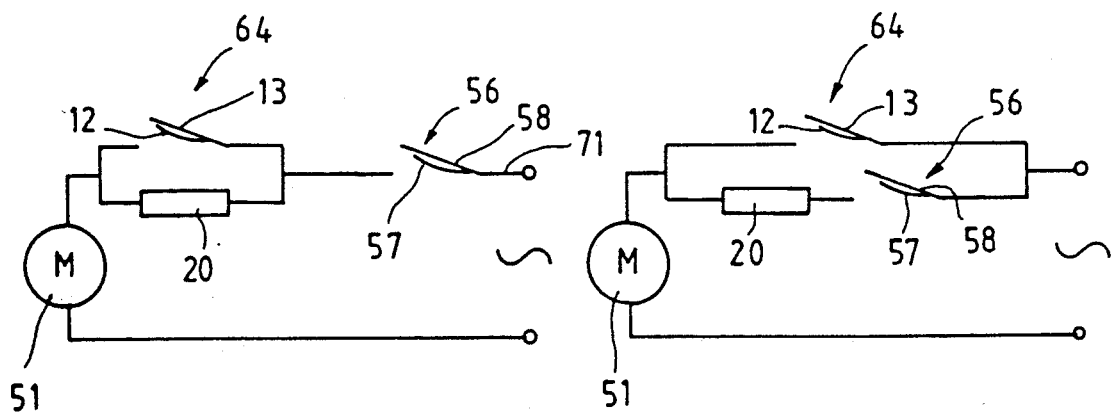
Fig. 9
Fig. 10

TEMPERATURE SWITCHING DEVICE

BACKGROUND OF THE INVENTION

The invention relates to a temperature switching device for an electrotechnical part to be protected against an excess temperature due to malfunctioning of, for example, a motor such as, a motor for roller blind drives or the like, with a first bimetallic switch and an ohmic resistor connected in parallel thereto, so that, after opening the bimetallic switch, as a result of an excess temperature, the flow of current takes place across the ohmic resistor, which produces heat and, as a result, the bimetallic switch is kept open even in the case of the cooling of the excess temperature initially triggering the switching processs due to a malfunction of the electrotechnical part to be protected, as a result of the evolution of heat of the ohmic resistor.

Self-holding temperature switching devices of the aforementioned type have been proposed and are self-holding because they are kept open by the resistor connected in parallel to the switch mechanism as a result of the heat evolution thereof following an opening of the switching device. In the case of use, particularly in connection with motors, a problem can arise with ohmic resistors in that, if the switching devices are encapsulated, a high temperature occurs due to the ambient temperature leading to the disconnection of the switch mechanism in addition to the resulting temperature produced by the parallel connected resistor in the switching device. This problem causes irreversible damage to the switching bimetallic element and/or insulating materials, such as, insulating varnish or coatings of wire, as well as the device to be protected. Moreover, sealing compounds, etc. are softened or damaged and even soldered joints can undergo a strength reduction. This problem can in particular occur with roller blind drives, because, even with very low external temperatures with drive and subsequent disconnection of the thermal switch, the thermal switch must be kept open by the parallel connected resistor, that is, the parallel connected resistor must produce a considerable amount of heat. However, the disconnection temperature must not be chosen too low, because otherwise the thermal switch would open in the case of heating, due to, for example, insulation, and therefore would render the drive inoperative.

In addition, self-holding temperature switching devices are known, in which the parallel connected resistor is a PTC and not ohmic resistor; however, these self-holding temperature switching devices are much more expensive than ohmic resistors, such as e.g. thick film resistors, etc.

The aim underlying the invention essentially resides in providing a switching device of the afore-mentioned type with an ohmic resistor connected in parallel to a thermal switch or, more generally, a temperature sensitive electrical switch or thermal switch, in which damage or deterioration to the thermal switch is reliably avoided following the disconnection thereof due to an ambient excess temperature.

According to the invention, a temperature switching device for an electrotechnical part to be protected against an excess temperature due to a fault, such as, for example, for roller blind drives or the like, provided which includes a first bimetallic switch and an ohmic resistor connected in parallel thereto, so that after opening the bimetallic switch as a result of an excess temperature the flow of current takes place across the ohmic resistor producing heat and, as a result the bimetallic switch is kept open even upon a cooling of the excess temperature initially triggering the switching process with at least the ohmic resistor being connected in series with a further, automatically resettable thermal switch having an opening temperature above that of the first thermal switch, but well below temperatures causing irreversible damage to bimetallic elements, and with the two thermal switchs being in close thermal contact.

According to the inventive construction, after the disconnection of the first thermal switch connected in parallel with the resistor and the following current flow through the parallel connected resistor, which brings about a temperature increase, which initially increase the excess temperature leading to the disconnection of the first thermal switch, the second thermal switch is opened and interrupts the current flow to the resistor so that the resistor creates no further heating power and produces no furher heat, whereby inadmissible excess temperatures which can damage bimetallic disks, sealing compounds or soldered joints are avoided.

According to preferred developments, the additional thermal switch is connected in series both with the first bimetallic thermal switch and with the ohmic resistor or the additional thermal switch is in parallel to the first thermal switch. According to another preferred development the two thermal switches are juxtaposed on a common heat conducting support.

According to another development of the invention a contact part of each switch its casing and the support are constructed in a current-conducting manner, while the support has facing clips bent in U-shaped manner over the thermal switches, as well as further clips securing the same.

According to further developments of the invention, the two thermal switches are axially superimposed or one of the switches has a spacer and the switches are interconnected by a rivet as a mechanical holding and electrical connecting member.

Miniature thermal switches of different constructions have been proposed in, for example, GB-1 377 990, GB-1 394 612, DE-OS Nos. 24 32 901, 24 42 090, 24 42 397, 25 05 966, 25 11 214, 26 44 411, U.S. Pat. Nos. 4,306,211, 4,470, 033. For details reference should be made to the aforementioned publications, whose content is made into part of the disclosure of the present application. These proposed switches are very compact with a casing and a cup-shaped lower part and an upper part closing the latter. In the casing is arranged a switch mechanism having one or more contacts, which are centrally carried and switched by a bimetallic disk. Such a thermal switch has a dimension of a few millimeters typically a diameter of 5 to 8 mm and a height of less than 5 mm. If there is only one contact pair formed by a movable contact part and a stationary opposite contact part, the current flow can, in the simplest form, take place via the bimetallic disk, but preferably the current flow takes place by an additional spring snap disk to the cup-shaped casing. In the case of two movable contacts with a corresponding opposite contact, the opposite contact is carried by a common support member moved by the bimetallic disk and the current flow takes place directly. From the opposite contacts which are generally arranged on the fixed part, the current can be tapped via a current transmission element on one or more outer connecting contacts. Thermal switches, namely, temperature limiters are known, which only interrupt the electric contact and can either be manually switched back for restoring the electrical connection, or can be replaced. Thermal switches are known which, following a significant temperature change, are automatically switched back again and restore the electrical connection. It can then occur that following the cooling of the bimetallic disk the latter switches back again and restores the electrical connection, without removing the fault which, directly due to the increased current flow or indirectly, led to the increased temperature evolution and therefore to the separation of the electrical connection by the bimetallic disk. Thus, such switches provide for so-called control cycles of operation.

According to a preferred development, the inventive switches device is formed by a casing with a cup-shaped lower part and a top part, with the lower part containing a switch mechanism with at least one bimetallic disk and a movable contact part and which under the action of the bimetallic disk the movable contact part can be linked with a stationary opposite contact, so that an electrical connection is formed between the lower part, movable contact part and opposite contact part a permanent, higher ohmic, electrical connection through the parallel connected resistor part is provided between the opposite contact part and lower contact part. Thus, miniature thermal switches can be constructed as self-holding thermal switches. The small dimensions of such switches and the arrangement in a small, closed casing are retained and there is a more effective heat production for reliably keeping the switch open.

For the optimum solution of the problem, the solution not adopted is that of bridging by a high value resistor the outer connection contacts connected to the connecting wires, as has generally been done in known open switches in order to construct them in a self-holding manner. In the case of the inventive miniature switches this would lead to a considerable increase in the size of the overall unit, so that the latter could no longer be used for the intended purpose. It would also be disadvantageous in such a construction that the heat transfer from the high value resistor to the bimetallic disk would be extremely poor. Thus, the invention proposes an integrated solution with an integrated construction of the high value resistor in the existing casing.

According to a particularly preferred construction, the electrical resistor of the resistor part is adjustable. Thus, with a single resistor part for different switches which, in the case of the same construction, have bimetallic disk with different switching temperatures, a single high value resistor part can be used which, as a function of the bimetallic disk used and its switching temperature can be adjusted and adapted thereto. Preferably the resistor part is a metal or carbon resistor part guided in an arcuate or curved manner and, in particular the resistor part is stamped from a metal disk or the carbon resistor is in particular pressed as a coating onto a support and covered by a solidified glass melt. According to a particularly preferred construction, for adjustment purposes removable bridges are provided between individual portions of the resistor part. Thus, according to a preferred construction, the invention proposes that the insulating cover part forming a mechanical connection between the stationary opposite contact or the curent transmission member from the stationary opposite contact to an outer connecting contact part and the casing lower part, is constructed as a high value resistor element or is provided with such, so that there is a high value connection between the stationary opposite contact and the metal casing lower part.

The inventive switch can in particular be used at difficultly accessible points, where there is little space and/or contamination is to be feared. It can in particular be used within the windings of electric motors, or in the case of pressure upstream of lamps and in heaters. A particular advantage results through the combination of the encapsulated miniature construction and self-holding, in that the switch can replace manually resettable switches, due to the resetting device, which had relatively large space requirements and which can be reduced with the same level of security by using the inventive switch.

BRIEF DESCRIPTION OF THE DRAWINGS

Further advantages and features of the invention can be gathered from the claims and the following description of two embodiments of the inventive thermal switch and with refrence to the accompanying drawings wherein:

FIG. 8 is a graphical illustration of a relationship between time and temperature;

FIG. 9 is a schematic view of a first construction in accordance with the present invention in a series connection;

FIG. 10 is a schematic view of another construction of the present invention provided with a series connection;

DETAILED DESCRIPTION

Figure 1:
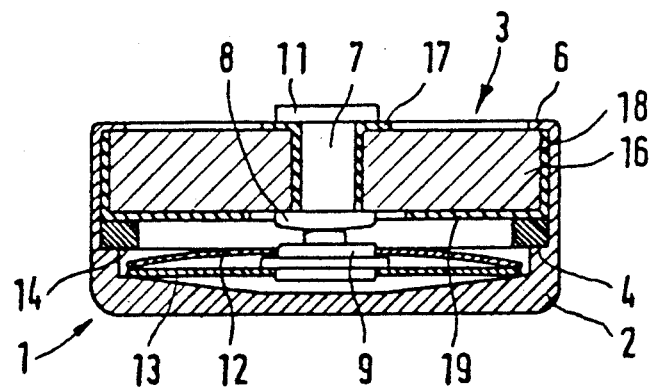
FIG. 1 is a cross-sectional view of a first embodiment of a thermal switch constructed in accordance with the present invention.

Referring now to the drawings wherein like reference numerals are used throughout the various views to designate like parts and, more particularly, to FIGS. 8-10, according to these figures, a self-holding thermal switch generally designated by the reference numeral 65 includes a switching element operable by a bi-metallic element 12 fashioned, for example, as a spring snap disk 13, with an ohmic resistor 20 being connected in parallel to the self-holding thermal switch 64. Upon a reaching of a switching temperature S (FIG. 8) of, for example, 140° in a supply circuit from a motor 51, as a result of impermissible heating of the motor, for example, due to a malfunctioning or damage thereto, the thermal switch 64 opens, that is, a bi-metallic element and spring disk 13 are separated, so that the motor 51 and ambient temperature drops in a manner illustrated by the dotted line in FIG. 8.

The ohmic resistor 20 is connected in parallel with the thermal switch 64 so that the thermal switch elements 12, 13 do not cycle or measure, and the current flow takes place entirely through the ohmic resistor 20 generates heat. Upon a superimposition of the temperature obtained through the ohmic resistor 20 and the ambient temperature 52, a temperature pattern 53 occurs in the switching elements 12, 13 and ohmic resistor 20 resulting in a considerable raising of the temperature up to, for example, 240° C., because the resistsor 20 must have a heating power such that, even in the case of low ambient temperature, the heating power of the resistor maintains the switching device 64 or thermal elements 12, 13 open and no cycling or measuring takes place. It is necessary to cover a wide ambient temperature range in, for example, the case of a roller blind drive motor. An overshooting can lead to temperatures reaching, for example, up to 240° C. in the thermal switch 64 which could lead to irreversible damage to the bi-metallic element 12 and also could result in a temperature which is too high for carbon black-containing resin materials. The present invention now proposes that, at least in series with ohmic resistor 20 a further self-resettable thermal switch 56 is provided with a bimetallic switching member 57 and a contact part 58, which has an opening temperature above the temperature switching point S of bimetallic element 12, but below temperatures which damage the carbon black-containing resin and/or bimetallic elements 12, 57, for example, a temperature of 180° C., as indicated in FIG. 8. When as a result of the ambient temperature and the heat produced by resistor 20, following the opening of the thermal switch 12, 13 the temperature reaches the switching temperature of the series-connected thermal switch 56, e.g. 180°, then thermal switch 56 also opens, so that the power supply of resistor 20 is interrupted and consequently the temperature rise corresponding to temperature pattern 53 is prevented and instead very rapidly corresponds to pattern 52 of FIG. 8. Unlike in the case of thermal switch elements 12, 13, thermal switch 56 can have a higher hysteresis.

Figure 11:
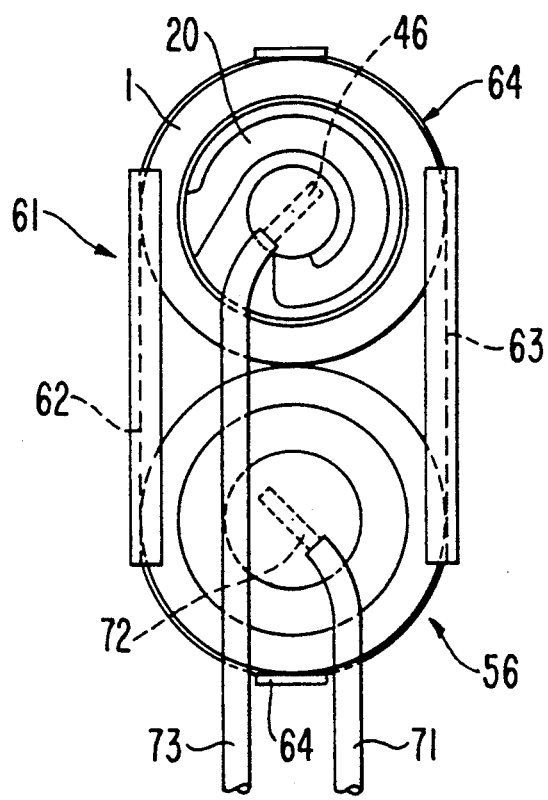
FIG. 11 is a plan view of a practical construction of the thermal switch of FIG. 9.

As shown in FIG. 9, the thermal switch 56 can now be in series with the complete thermal switch 64, that is, thermal switch elements 12, 13 and ohimic resistor 20, or only with the ohmic resistor 20, but in parallel to the switching elements 12, 13, as shown in FIG. 10. A specific embodiment of the circuit of FIG. 9 is shown in FIG. 11 wherein a self-holding thermal switch generally designated by the reference numeral 61 is provided, in which through a common bow-shaped holding part 62 with lateral clips 63 and end clips is firstly held the self-holding thermal switch 64, with thermal elements 12, 13 and ohmic resistor 20, and also the series connected additional thermal switch 56. The holding part 61 can be both current and heat conducting if it is made, for example, from metal, so that a current flow from line 71 takes place across the connecting clip 46, thermal switch 64, casing 1, holding part 61, casing of the thermal switch 56, switch mechanism of the thermal switch 56, connection 72 and line 73.

Figure 12:
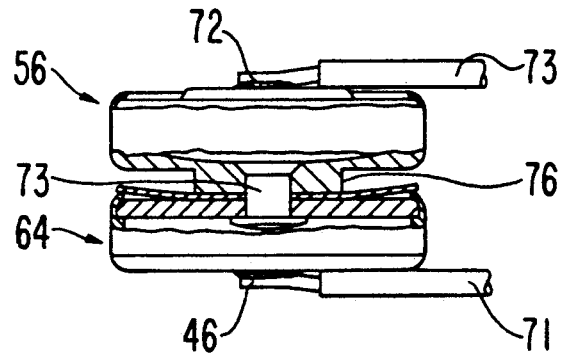
FIG. 12 is a partial cross-sectional view of another embodiment of a thermal switch constructed in accordance with the present invention.

FIG. 12 provides another example of a switching device similar to that of FIG. 9; however, in FIG. 12, the two thermal switches 64, 56 are superimposed by being interconnected by a rivet 73 as a mechanical holding and current transmission member. While the thermal switch 56 is constructed in a conventional manner, preferably, the self-holding thermal switch 64 is constructed in a manner more fully described hereinbelow in connection with FIGS. 1-7.

Figure 2:
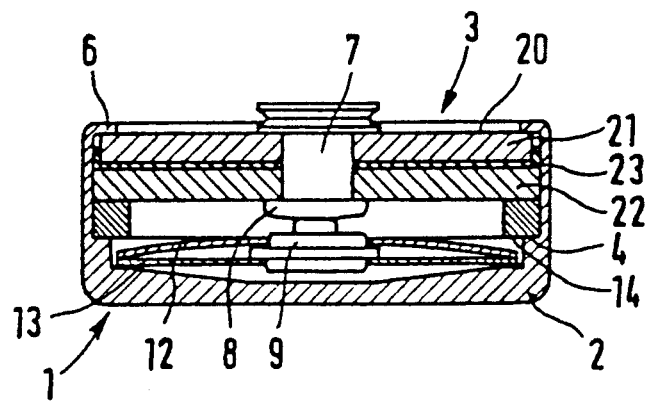
FIG. 2 is a cross-sectional view of another embodiment of a thermal switch constructed in accordance with the present invention.

As shown in FIGS. 1 and 2, the thermal switches of the present invention are essentially constructed in a circular manner, with the thermal switches including a casing generally designated by the reference numeral 1 with a cup-shaped lower part 2 and a cover part 3 sealing or covering the same. In a conventional manner, the cover part 3 is either directly or indirectly located on a circumferential step 4 of the lower part 2 and is pressed against the same by a crimping 6 or beading of the lower part 2 located on the opposite side of the cover part 3. As with conventional thermal switches, the cover part 3 is made from an insulating material such as, for example, a ceramic or plastic materials, or to the extent that it is conductive, it is electrically insulated from the cup-shaped lower part 2. in the latter case, the electrically conductive part of the cover part 3 serves as an opposite contact part as described in, for example, DE-OS No. 29 17 482 and corresponding U.S. Pat. No. 4,306,211. In the former case, the cover part 3 is traversed by one or more current transmission members 7, which, towards an inside electrically interconnect a stationary opposite contact part 8 with a movable contact part 9 and towards an outside, carry a connecting contact element 11. In the embodiment of FIGS. 1 and 2, the lower part 2 contains a bi-metallic disk 12 and spring snap disk 13 which, in central openings, surround and support the movable contact 9. In the illustrated position, the bi-metallic disk 12 is relieved and contact part 9 is pressed by the spring snap disk 13 against the stationary opposite contact 8. Upon exceeding a predetermined temperature limit, the bi-metallic disk jumps over and comes into engagement with the outer edge on a step 14 and presses the contact 9 away from the opposite contact 8 in opposition to the biasing action of the spring disk 13 so as to interrupt the current flow which, in the illustrated closed position, passes from the connecting contact 11 through connecting part 7, opposite contact 8, movable contact 9, spring snap disk 13 to the lower part 2 which can be connected to a further external connection.

In FIG. 1, the cover part 3 has a resistor 16, such as a thick film resistor, which surrounds and carries the current transmission member 7 and is electrically connected to the latter and at crimping 6 to the casing lower part 2. In the case of given geometrical dimensions, in order to make the current flow path across resistor 16 and therefore the electrical resistance brought about by the latter as large as possible, between the resistor 16 and the current transmission member 7 is provided an insulating sleeve, so that resistor 16 is only in electrical connection with the stationary opposite contact 8 in the inner lower region. In the same way between the circumferential wall of the resistor 16 and the axially parallel casing wall of lower part 2 is provided insulating material 18, which is also drawn over the resistor 16 in an area 19. Thus, the contacting of resistor 16 with casing lower part 2 only takes place in the vicinity of the upper outer circumference at crimping 6.

If the thermal switch is in the illustrated closed position, the current flows in the aforementioned manner across contact 9 and spring snap disk 13, whereas, the current flow across resistor 16 is negligible, because its resistance is relatively high compared with the aforementioned current path. If the switch now opens through raising contact 9 from opposite contact 8, then a current determined by the resistance of resistor 16 flows across the same and heats it. As a result of the heating a temperature is maintained, in which the bimetallic snap disk 12 keeps contact 9 away from opposite contact 8, so that the current path continues to be interrupted. A snapping back of bimetallic disk 12 is only possible if the voltage applied across thermal switch 1 is interrupted manually, so that can no longer current flow across the resistor 16. As a result of the cooling the bimetallic disk 13 can then spring back into its respresented, relieved position, so that the connection between the contact and opposite contact is again restored under the action of the bi-metallic disk 13. After again applying a voltage, current can again flow across the opposite contact 8 into contact 9.

Figure 3:
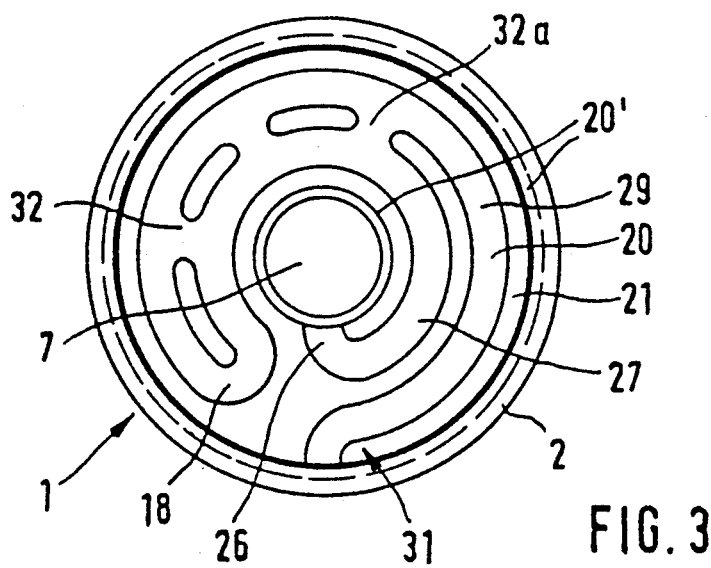
FIG. 3 is a plan view essentially through a resistor in the embodiment of FIG. 2.

In the embodiment according to FIG. 2, a resistor element 20 is so arranged on a ceramic support 21, that it forms a high value, conductive resistance connection between the current transmission member 7 and the wall of the casing lower part 2. In order to obtain a sought high resistance of the resistor element 20, the latter does not connect the current transmission member 7 directly radially to lower part 2, but instead has a bent or undulating form with part ring-like in interruption zones, as shown in FIG. 3. Resistor element 20 has contact rings and contacts with one of the latter the current transmission member 7 at 26, then passes radially and then into a part ring-like circle 27 to just before the extension piece 26 at 28, then radially outwards and then in a second ring-like part 29 to an area 31 radially outside area 26 and then radially again until it engages with the wall of lower part 2, where the outer contact ring 20 contacts the lower part 2 via crimping 6. Below ceramic support 21 is provided a further ceramic part 22 between which is arranged an intermediate layer 23 of Teflon, Kapton, etc. for sealing purposes. The latter is slightly bent upwards and is fixed between the wall of lower part 2 and insulating support 21 (right of FIG. 2). Branches 27, 29 are provided with radial connecting pieces 32. If all the radial connecting pieces 32 are retained, then the current flow can pass across the first radial connecting piece 32a and the resistance is low. These connecting pieces 32 can also be broken out starting from the radial connecting piece 32a, so that the resistance of resistor element 20 is increased and can be stepwise adjusted to a desired value. Heat is produced in resistor element 20 and contributes to keeping the bimetallic snap disk 12 in its high temperature position and therefore the switch in its open position.

In the embodiment of FIGS. 2 and 3 two annular metal contacts 20' were installed on the outer and inner circumference of the ring-like ceramic part. Resistor element 20 is a carbon resistor applied to the ceramic support 21 initially applied as a material containing carbon and glass in the described contour on the surface of the ceramic support. On heating the glass material melts and covers the top of the carbon in an insulating manner and fixes it in the applied contour. The connecting pieces 32a can be separated by sand or laser blasting and, as resistor element 20 is located on the top of ceramic support 21, also following the installation of the switch, so that it is possible to subsequently make resistance changes or corrections.

Figure 4:
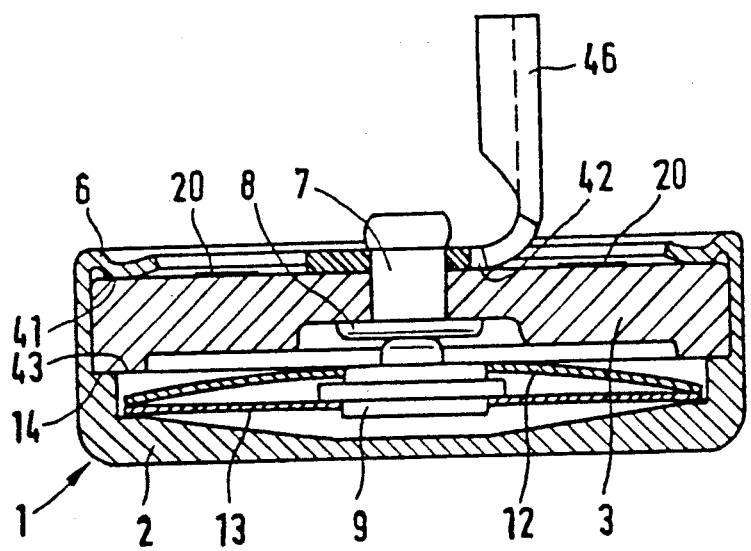
FIG. 4 is a cross-sectional view of another embodiment of a thermal switch constructed in accordance with the present invention.
Figure 5:
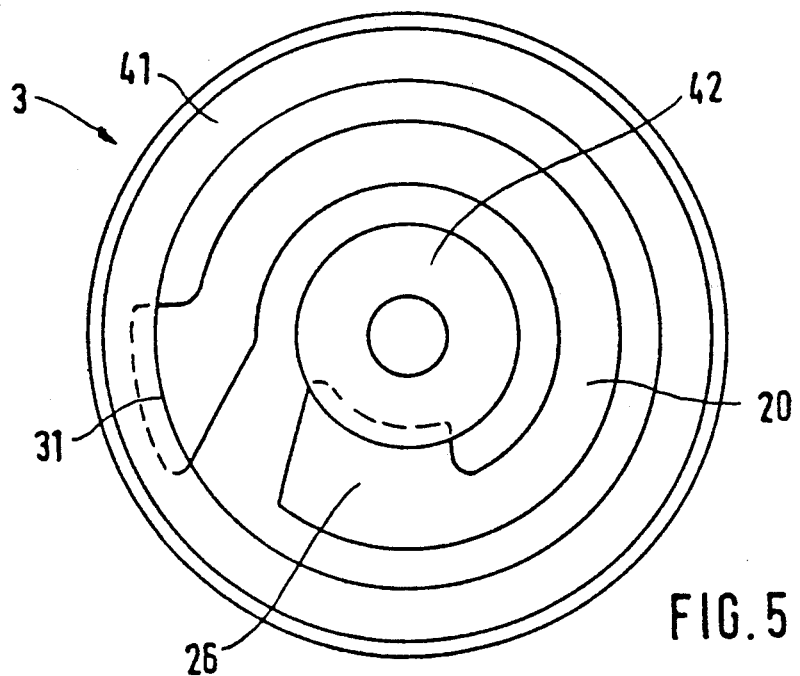
FIG. 5 is a plan view of a cover part of the thermal switch of FIG. 4.
Figure 6:
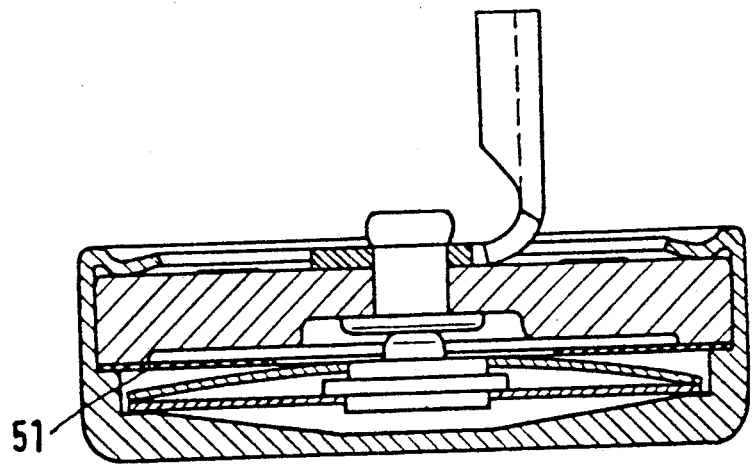
FIG. 6 is a cross-sectional view of another embodiment similar to the embodiment of FIG. 4 with an additional insulating disk.
Figure 7:
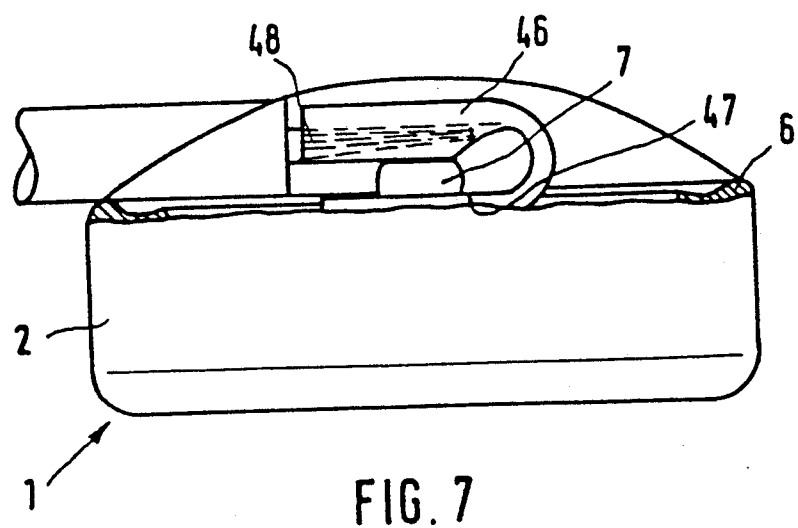
FIG. 7 is a schematic side view of a thermal switch of the present invention with a sealed cover part.

In the construction according to FIGS. 4 and 5, the cup-shaped lower part 2 of casing 1 contains a one-piece cover part 3 made from oxide ceramic and which forms the ceramic support for resistor element 20. The latter comprises a silver coating pressed onto cover part 3 and which can also be stoved. The contact or connecting areas 26 are circumferentially extended in this embodiment, so that there is good contacting with contact rings 41, 42. Contact ring 41 is used for producing the electrical connection to casing lower part 2, while contact ring 42 produces the electrical connection to opposite contact part 8 or current transmission member 7. Contacting can be assisted in that there is a tin coating in areas 41, 42, which is initially pressed on and subsequently heated to the flow point of tin. Thus, the tin flows into the gaps between lower part 2 and cover part 3 on the one hand and between cover part 3 and current transmission member 7 on the other and thus, apart from the good electrical contacting, provides a seal with respect to the interior of the casing, which assists and in part renders dispensable other sealing members, such as e.g. sealing rings (cf. also FIG. 6) between the step 14 of the lower part and the associated shoulder 43 of cover part 3. Here again the upper edge of the lower part is bent over inwards in the form of a bead 6. By tin coating the conductor path at least in the ring region 41, the beading 6 can press into the relatively soft tin and therefore also contributes to the sealing action and also to the electrical contacting in an easy manner. Then by soldering to the lower part 2 in the vicinity of bead 6 and/or the current transmission member 7 (connecting or contact groove) a hermetic seal can be obtained. For contacting on a cord or strand, in this embodiment the current transmission member 7 is provided with a connecting clip 46 projecting vertically from the casing upper surface via a base part 47 thereof and which in preferred manner permits the welding of cords 48 at the given temperatures wihtout any need to fear overheating of the switch mechanism of the thermal switch because through the construction of the clip 46 the heat source for welding is a relatively long distance from the switch mechanism. Only subsequently is the connecting clip 46 bent over, so that parallel to its base part 47 acting on member 7 it extends in the opposite direction thereto over cover part 3 (FIG. 7). The second connection is brought about by soldering a further cord (not shown) to the lower part 2. Cover part 3 is sealed in by a conventional sealing compound with the complete connection area formed by parts 7, 46, 47, 48 and which in the represented embodiment is transparent, but can also be opaque. The resistor element 20 can be covered by an insulating material, e.g., by applying a varnish, a plastic or the like.

There is also a sealing disk 51 made from thermostable polyimide (KAPTON) between lower part 2 and cover part 3, being secured between step 14 and switch 43, so that a mechanical seal is obtained. As a result of the construction, it is possible in certain cases to do away with any sealing by tin and optionally soldering, although the latter can additionally be provided.

The essential advantage of the inventive switch is that, despite construction as a self-holding switch, as a result of its design on reaching a high sealing effect it can have the same extremely small dimensions as conventional miniature bimetallic switches, so that the "self-holding" requires no additional volume compared with conventional switches. The inventive switch can use conventional lower parts, bases, switch mechanisms, contact and connecting parts, so that it is only necessary to use a few new parts, optionally only an inventive cover part in place of a conventional part. The necessary high value resistor bridging the switch mechanism is achieved in the inventive manner. The inventive switch can replace conventional switches wherever they have previously been used without involving additional space. The represented switches e.g. have a diameter of 8 to 9 mm and a height of 2 to 2.5 mm (without sealing compound and connecting clip, but 3.5 to 4 mm with the latter), in the case of a cover part thickness, including resistor 20 of up 1 mm in the case of adequate insulation.

What is claimed is:

1. Temperature switching device for an electrotechnical part to be protected against an excess temperature due to a malfunctioning of the electrotechnical part, the temperature sensitive device including a first thermal switch means, an ohmic resistor means connected in parallel to said first thermal switch means, said first thermal switch means being adapted to be opened as a result of an excess temperature so that a flow of current takes place across the ohmic resistor means, and at least one automatically resettable second thermal switch means having an opening temperature above an opening temperature of the first thermal switch means but well below temperatures causing irreversible damage to bimetallic elements of the first and second thermal switch means such that heat produced as a result of the flow of current across the ohmic resistor means does not maintain the first thermal switch means in an open position upon a cooling of the excess temperature initially triggering the switching process of the first thermal switch means, and wherein the two thermal switch means are in close thermal contact.

2. Switching device according to claim 1, wherein the second thermal switch means is in series with both the first thermal switch means and the ohmic resistor means.

3. Switching device according to claim 1, wherein the second thermal switch means is arranged parallel to the first thermal switch means.

4. Switching device according to claim 1, wherein the first and second thermal switch means are juxtaposed on a common heat conducting support.

5. Switching device according to claim 4, wherein each of said first and second thermal switch means includes a contact part forming a casing means, and wherein the support is current-conducting.

6. Switching device according to one of claims 4 or 5, wherein the support includes facing U-shaped clips bent over the first and second thermal switch means, and further clip means for holding said U-shaped clips.

7. Switching device according to one of claims 1 or 2, wherein the first and second thermal switch means are axially superimposed.

8. Switching device according to claim 7, wherein at least one of the thermal switch means includes a spacer, and wherein the first and second thermal switch are interconnected by a rivet means for forming a mechanical holding and electrical connecting member.

9. Switching device according to claim 7, wherein said first and second thermal switch means each includes chamber means for accommodating the bimetallic elements, and wherein the bimetallic elements are interconnected by a casing part of electrically conductive material.

10. Switching device according to claim 7, wherein a casing means includes a cylindrical central piece and two cap means placed against opposite ends of the casing means for enclosing chamber means for accommodating the first and second thermal switch means between them and the central piece.

11. Switching device according to one of claims 1 or 2, further comprising a casing means including a cup-shaped lower part and a cover part, the bimetallic element of at least one of the first and second thermal switch means includes at least one bimetallic disk and a movable contact part whereby under an action of the bimetallic disk, the movable contact part can be connected to a stationary opposite contact so as to produce an electrical connection between the lower part, the movable contact and the opposite contact part, and wherein a permanent higher value electrical connection is provided between the opposite contact part and the lower part by the parallel connected ohmic resistor means.

12. Switching device according to claims 1 or 2, wherein an electrical resistance of the ohmic resistor means is adjustable.

13. Switching device according to claim 1 or 2, wherein the ohmic resistor means is a spiral curved metal resistor part.

14. Switching device according to claim 13, wherein the ohmic resistor means is stamped from a metal disk.

15. Switching device according to one of claims 1 or 2, wherein the ohmic resistor means is a carbon resistor.

16. Switching device according to one of claims 1 or 2, wherein the ohmic resistor means is one of sealed or melted around by an insulator cover.

17. Switching device according to claim 13, further comprising removable bridge means arranged between individual portions of the ohmic resistor means.

18. Switching device according to claim 1, wherein the ohmic resistor means are arranged on insulating material support means.

19. Switching device according to claim 18, wherein the insulating material support means are made from a ceramic material.

20. Switching device according to one of claims 18 or 19, wherein the ohmic resistor means is pressed onto the support means.

21. Switching device according to one of claims 1 or 2, wherein at least the first thermal switch means is sealed by a sealing disk means.

22. Switching device according to one of claims 1 or 2, wherein at least one of the first and second thermal switch means is sealed by soldering.

23. Switching device according to one of claims 1, 2, 3, 4 or 5, wherein the electro-technical part includes roller blind drives.

24. A temperature switching device comprising a first thermal switch means, and ohmic resistor means connected in parallel to said first thermal switch means, and a second thermal switch means connected in series with the at least one ohmic resistor means, and wherein the second thermal switch means has a higher opening temperature than an opening temperature of the first thermal switch means in order to protect the first thermal switch means.

25. A thermal switch in a temperature switching device including a self-holding thermal switch means and a resistor means arranged in parallel to the self-holding thermal switch means, said thermal switch having an opening temperature higher than an opening temperature of said self-holding thermal switch means so as to protect the self-holding thermal switch means against damage due to an excessive temperature brought about by the parallel connected resistor means.

* * * * *